US012226684B2

(12) United States Patent
Quinn

(10) Patent No.: US 12,226,684 B2
(45) Date of Patent: *Feb. 18, 2025

(54) APPARATUS, SYSTEMS, AND METHODS FOR TRAINING A SPORTS PLAYER

(71) Applicant: Patrick Joseph Quinn, Ridgeway (CA)

(72) Inventor: Patrick Joseph Quinn, Ridgeway (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/220,783

(22) Filed: Jul. 11, 2023

(65) Prior Publication Data

US 2023/0347229 A1    Nov. 2, 2023

Related U.S. Application Data

(63) Continuation of application No. 17/268,864, filed as application No. PCT/CA2019/051119 on Aug. 16, 2019, now Pat. No. 11,745,078.

(30) Foreign Application Priority Data

Aug. 16, 2018   (CA) ................................ CA 3014347

(51) Int. Cl.
  *A63B 71/06*  (2006.01)
  *A63B 24/00*  (2006.01)
  *G08B 5/36*   (2006.01)

(52) U.S. Cl.
  CPC .......... *A63B 71/06* (2013.01); *A63B 24/0021* (2013.01); *A63B 2024/0028* (2013.01);
  (Continued)

(58) Field of Classification Search
  CPC ................ A63B 71/06; A63B 24/0021; A63B 2024/0028; A63B 2220/62;
  (Continued)

(56) References Cited

U.S. PATENT DOCUMENTS 2,805,777 A    9/1957   Larson
5,249,723 A   10/1993   Lamadelein
(Continued)

FOREIGN PATENT DOCUMENTS

CA         2312671         6/2000
CA         2715697 A1      3/2012
(Continued)

*Primary Examiner* — Jeffrey S Vanderveen
(74) *Attorney, Agent, or Firm* — Tucker Ellis LLP

(57) ABSTRACT

A training apparatus is disclosed that comprises an obstacle member defining a pass-under area for a sports player to pass a sport-projectile through when in use. The training apparatus comprises a first sensor that is configured to detect the sport-projectile passing through the pass-under area, and a controller that is configured to determine a pass-through direction of the sport-projectile that passes through the pass-under area based on data received from the first sensor. The training apparatus also comprises a lighting fixture indicating an instructed pass-through direction for the sports player to pass the sport-projectile through the pass-under area. A system for training a sports player is described that comprises a plurality of training apparatuses that are remotely configurable to define a training drill for a sports player and to collect training data from execution of the training drill. A method for training a sports player is also disclosed.

20 Claims, 13 Drawing Sheets

(52) U.S. Cl.
CPC ..... *A63B 2220/62* (2013.01); *A63B 2220/805* (2013.01); *A63B 2220/833* (2013.01); *A63B 2225/20* (2013.01); *A63B 2225/54* (2013.01); *G08B 5/36* (2013.01)

(58) Field of Classification Search
CPC ........ A63B 2220/805; A63B 2220/833; A63B 2225/20; A63B 2225/54; A63B 71/03; A63B 24/0006; A63B 63/06; A63B 2071/0683; A63B 69/0026; A63B 71/0622; A63B 2071/065; A63B 2102/22; A63B 2102/24; A63B 2220/801; A63B 2220/802; A63B 2220/807; A63B 2220/89; A63B 2225/093; A63B 2225/15; A63B 2225/50; A63B 2225/74; G08B 5/36; G01S 17/58

See application file for complete search history.

(56) References Cited

U.S. PATENT DOCUMENTS

| | | |
|---|---|---|
| 5,678,700 A | 10/1997 | Crosson, Jr. |
| 5,848,716 A | 12/1998 | Waranius |
| 5,865,691 A | 2/1999 | Chen |
| 6,165,084 A | 12/2000 | Cranston |
| 6,250,480 B1 | 6/2001 | Mcguinness |
| 6,431,627 B1 | 8/2002 | Tomeny |
| 6,499,608 B1 | 12/2002 | Sterling |
| 6,575,513 B2 | 6/2003 | Pikel |
| 6,749,074 B1 | 6/2004 | Hileman |
| 7,441,669 B1 | 10/2008 | Dalbey |
| 8,357,061 B2 * | 1/2013 | Quinn ................. A63B 69/0026 473/422 |
| 8,905,868 B2 | 12/2014 | Quinn |
| 9,185,361 B2 * | 11/2015 | Curry ............... H04N 21/21805 |
| 10,446,051 B2 | 10/2019 | Tinjust |
| 10,478,698 B2 | 11/2019 | Tinjust |
| 10,596,433 B1 * | 3/2020 | Schutt .................... A63B 71/03 |
| 10,926,146 B2 * | 2/2021 | Stypka ............. A63B 69/0024 |
| 2002/0113030 A1 | 8/2002 | Belisle |
| 2004/0238384 A1 | 12/2004 | Cameron |
| 2006/0063615 A1 * | 3/2006 | Richardson ........ A63B 69/0026 473/446 |
| 2008/0248902 A1 | 10/2008 | Salvador et al. |
| 2008/0287224 A1 | 11/2008 | Salvador et al. |
| 2010/0026809 A1 | 2/2010 | Curry |
| 2012/0083367 A1 | 4/2012 | Quinn |
| 2012/0157242 A1 | 6/2012 | Quinn |
| 2014/0169758 A1 * | 6/2014 | Sapoznikow ...... G06K 7/10009 386/241 |
| 2015/0140529 A1 | 5/2015 | Tinjust |
| 2015/0216301 A1 | 8/2015 | Yates |
| 2017/0095717 A1 * | 4/2017 | Simonov ............ A63B 69/0053 |
| 2018/0078820 A1 * | 3/2018 | Bundock ............ A63B 37/0054 |
| 2018/0339210 A1 | 11/2018 | Linneman |
| 2019/0224547 A1 | 7/2019 | Theriault et al. |
| 2019/0366180 A1 | 12/2019 | Waffensmith |
| 2021/0101060 A1 | 4/2021 | McGAULEY |

FOREIGN PATENT DOCUMENTS

| | | |
|---|---|---|
| CA | 2992873 | 7/2019 |
| CA | 3091160 | 8/2019 |
| CA | 3014347 | 2/2020 |
| WO | 2013152443 A1 | 10/2013 |

* cited by examiner

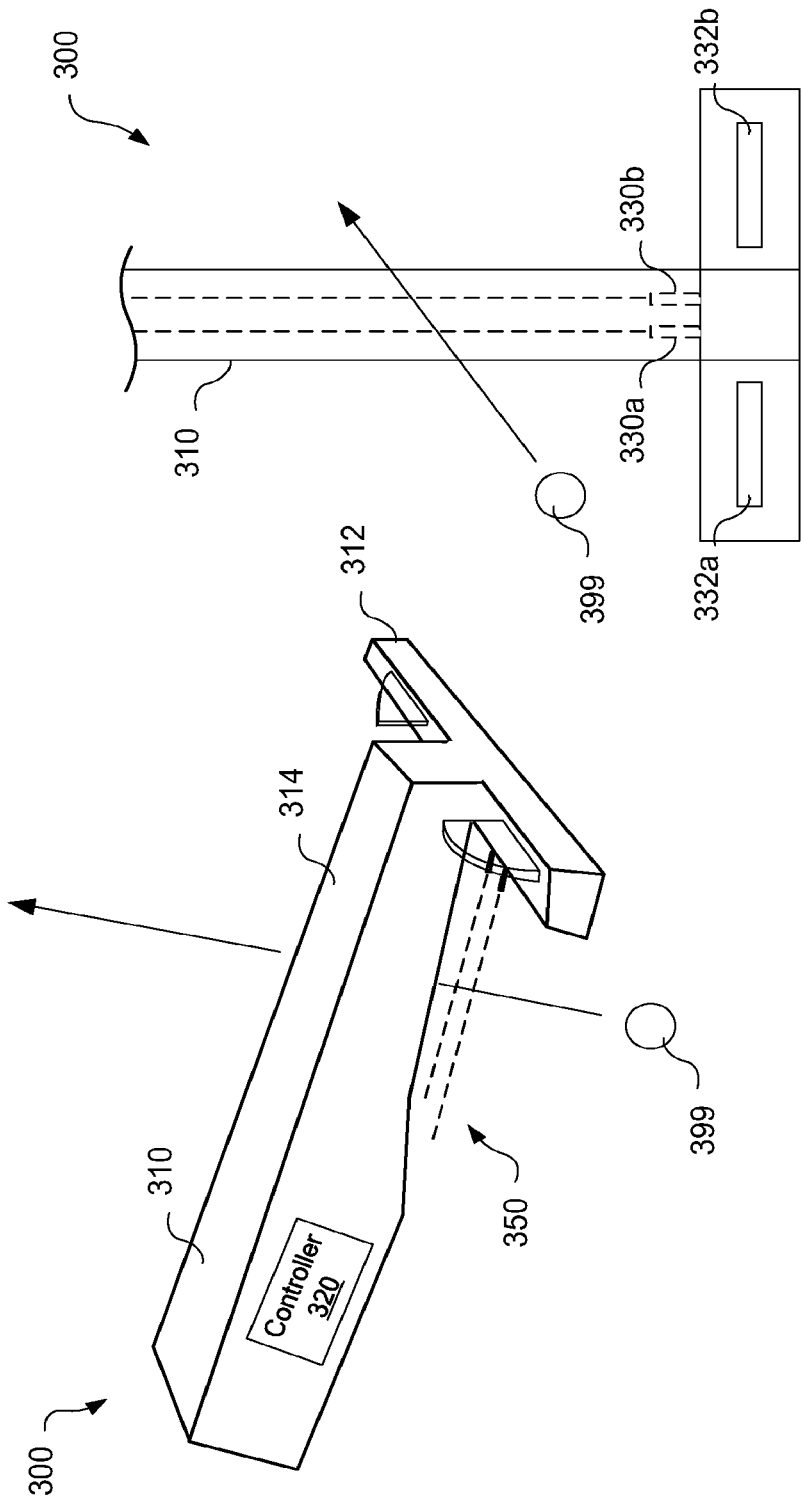

APPARATUS, SYSTEMS, AND METHODS FOR TRAINING A SPORTS PLAYER

CROSS-REFERENCE TO RELATED APPLICATIONS

This application is a continuation of application Ser. No. 17/268,864 filed on Feb. 16, 2021, which is a US National Phase application of PCT/CA2019/051119 filed on Aug. 16, 2019, which claims priority to Canadian patent application 3014347 filed on Aug. 16, 2018.

TECHNICAL BACKGROUND

The present disclosure relates to a training apparatus for athletes.

BACKGROUND

Various equipment may be utilized for training athletes. For example, conventional training techniques may use one or more pylons arranged in a specific configuration and a sports player may execute a training drill that involves moving themselves and/or a sport-projectile around the pylons. When a sports player wishes to refine their skills using conventional equipment such as pylons, a coach and/or the player must manually arrange the equipment in accordance with the training exercise/drill prior to executing the drill. The coach and/or player assess the player's skill with respect to the execution of the drill, often by visual observation or manually timing the player's progress through the drill. Training a sports player using conventional equipment therefore has several inefficiencies that may inhibit training of the sports player and refining of their skills.

Accordingly, a training apparatus, system, and method that enhance, improve and/or simplify training of a sports player remain highly desirable.

SUMMARY

In accordance with one aspect of the present disclosure a training apparatus for training a sports player is disclosed, comprising: an obstacle member defining a pass-under area for a sport-projectile to pass through when in use, the obstacle member comprising: a support portion for supporting the obstacle member on a training surface when in use; and a pass-under portion supported by the support portion at a height above the training surface sufficient to allow the sport-projectile to pass between the training surface and a lower surface of the pass-under section of the obstacle member when in use; a first sensor configured to detect the sport-projectile passing through the pass-under area when in use; and a controller coupled to the first sensor and configured to determine a pass-through direction of the sport-projectile that passes through the pass-under area based on data received from the first sensor.

In accordance with another aspect of the present disclosure a training apparatus is disclosed, comprising: an obstacle member defining a pass-under area for a sport-projectile to pass through when in use, the obstacle member comprising: a support portion for supporting the obstacle member on a training surface when in use; and a pass-under portion supported by the support portion at a height above the training surface sufficient to allow the sport-projectile to pass between the training surface and a lower surface of the pass-under section of the obstacle member obstacle member when in use; a lighting fixture to indicate an instructed pass-through direction of the sport-projectile through the pass-under area; and a controller coupled with the lighting fixture and configured to: receive, via a wireless communication interface, configuration data from an external device indicating the instructed pass-through direction; and control the lighting fixture to indicate the instructed pass-through direction.

In accordance with yet another aspect of the present disclosure a system for training a sports player, comprising: a plurality of training apparatuses, each training apparatus comprising: an obstacle member defining a pass-under area for a sport-projectile to pass through when in use, the obstacle member comprising: a support portion for supporting the obstacle member on a training surface when in use; and a pass-under portion supported by the support portion at a height above the training surface sufficient to allow the sport-projectile to pass between the training surface and a lower surface of the pass-under section of the obstacle member obstacle member when in use; a lighting fixture to indicate an instructed pass-through direction of the sport-projectile through the pass-under area; and a controller coupled with the lighting fixture and configured to: receive, via a wireless communication interface, configuration data sent from a central controller indicating the instructed pass-through direction; and control the lighting fixture to indicate the instructed pass-through direction, wherein the configuration data sent from the central controller co-ordinates the instructed pass-through directions for the plurality of training apparatuses to define a training drill for the sports player.

In accordance with yet another aspect of the present disclosure a method for training a sports player, comprising: receiving, from a central controller, configuration data for a plurality of training apparatuses each comprising an obstacle member that defines a pass-under area for a sport-projectile to pass through and a lighting fixture to indicate an instructed pass-through direction of the sport-projectile through the pass-under area, the configuration data indicating the instructed pass-through direction for each training apparatus; identifying from the configuration data the instructed pass-through directions for respective training apparatuses of the plurality of training apparatuses; and configuring each training apparatus to indicate the respective pass-through direction by transmitting the configuration data comprising the respective pass-through direction to the respective training apparatuses.

BRIEF DESCRIPTION OF THE DRAWINGS

Further features and advantages of the present disclosure will become apparent from the following detailed description, taken in combination with the appended drawings, in which:

FIG. 3A shows an isometric view of a training apparatus configured to detect a sport-projectile in accordance with a first aspect when in use;

FIG. 3B shows a top view of the training apparatus configured to detect the sport-projectile in accordance with the first aspect when in use;

It will be noted that throughout the appended drawings, like features are identified by like reference numerals.

DETAILED DESCRIPTION

Figure 1:
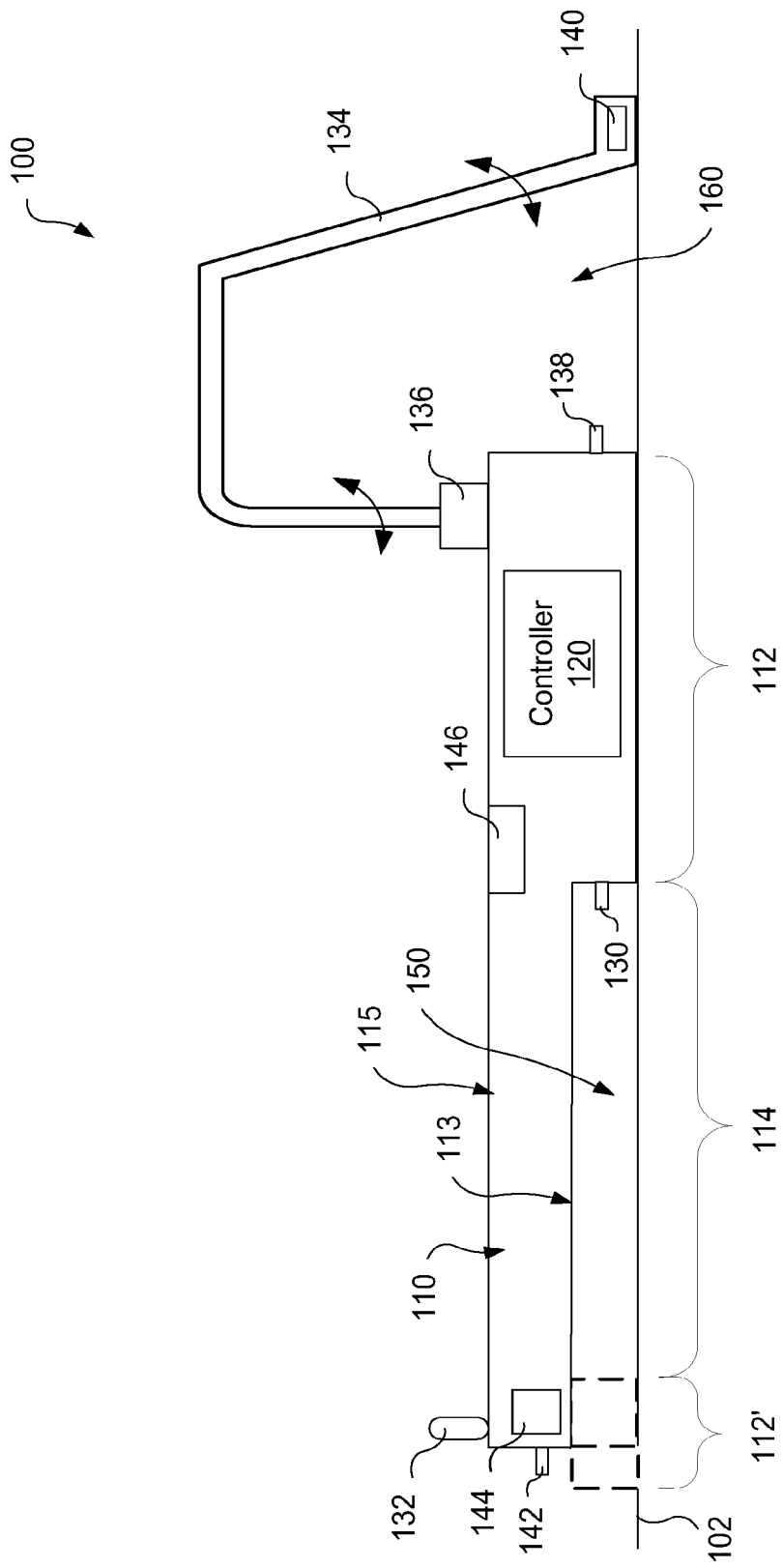
FIG. 1 shows a side view of a training apparatus in accordance with some aspects of the present disclosure.

The present disclosure describes a training apparatus, system, and method for training a sports player. Although the training apparatus can be readily adapted for different sports, the training apparatus depicted in the figures is sized for use in hockey training. In use, a number of the training apparatuses may be arranged on the ice and players may skate from one to the other and perform some action such as passing the puck through a pass-under portion of the apparatus. In order to simplify the setting up and running of such drills, each of the training apparatuses may include controllable indicators, such as lights, that provide queues to the player, such as what training apparatus to proceed to next or what action to perform. The training apparatuses may include wireless communication interfaces in order to allow the controllable indicators to be remotely configured, such as by a coach using a smart phone or tablet. As such, the training apparatuses can be set out in a particular physical configuration and then different drills may be run by controlling the controllable indicators, for example by changing an order the indicators light up in. In some embodiments of the training apparatus, in addition to the light up indicators, or as an alternative to the light up indicators, the training apparatus may include one or more sensors that can detect the passing through of the sport projectile in a vicinity of one or more locations of the training apparatus. For example, a sensor may be arranged to detect when a puck passes under a pass-under section of the training apparatus. The sensor data may provide more precise information regarding the players performance such as an elapsed time between passing the puck under respective training apparatuses. The sensors and indicators may be used in conjunction with each other. For example, the indicators may provide an indication to the player of a particular action to perform and the sensors may provide data to indicate whether or not the player successfully completed the indicated action.

A training apparatus may comprise an obstacle member defining a pass-under area for a sports player to pass a sport-projectile through when in use. The training apparatus may further comprise a first sensor that is configured to detect the sport-projectile passing through the pass-under area, and a controller that is configured to determine a pass-through direction of the sport-projectile that passes through the pass-under area based on data received from the first sensor. The training apparatus may also comprise a lighting fixture indicating an instructed pass-through direction for the sports player to pass the sport-projectile through the pass-under area. The controller of the training apparatus may be configured to determine if the pass-through direction determined from the sensor data is the same as the instructed pass-through direction, among other things, thereby generating training data for the sports player when in use.

The controller may control the lighting fixture to indicate the instructed pass-through direction based on configuration data received from an external device. The controller may also control the lighting fixture to indicate a modified instructed pass-through direction based on data received from other training apparatuses. In this manner, the training apparatus disclosed herein is remotely configurable as well as reactive to events that occur at other training apparatuses.

The controller may be configured to send training data such as the sensor data and/or the determination of the pass-through direction to an external device. The controller may also be configured to send the determination of whether or not the determined pass-through direction is the same as the instructed pass-through direction to an external device. The external device may be a central controller and/or another training apparatus. In this manner, the training apparatus disclosed herein provides for integrated data collection of a sports player.

The training apparatus may additionally comprise one or more defense resembling members (e.g. a member that resembles a defender's hockey stick, a foot/shin of a defending soccer player, etc.) that is/are rotatably mounted to the training apparatus and coupled with an actuation device controlled by the controller. The controller may control rotation of the defense resembling member(s) in accordance with a random or non-random motion, based on configuration data received from an external device, and/or based on data received from other training apparatuses. In this manner, the training apparatus disclosed herein provides dynamic training equipment that can be remotely configurable and reactive to events that occur at other training apparatuses.

A system for training a sports player is described that comprises a plurality of training apparatuses. In accordance with the system, configuration data may be sent to one or more of the training apparatuses to remotely configure the training apparatuses to define a training drill for a sports player. The configuration data may be wirelessly sent by a coach that is controlling a central controller such as a tablet or other portable electronic device and which is connected to at least one of the training apparatuses over a communication network.

The configuration data may indicate instructed pass-through directions for the plurality of training apparatuses (i.e. for each training apparatus, which direction a sports player performing the drill should pass the sport-projectile through the pass-under area). Where the plurality of training apparatuses further comprise defense resembling members, the configuration data may further indicate a desired start positioning (i.e. rotational angle) of the defense resembling member(s).

The plurality of training apparatuses may also be communicatively coupled with one another. During execution of the training drill by the sports player, one training apparatus may send data to another training apparatus, which may dynamically adjust its configuration such as by indicating a modified pass-through direction and/or by rotating a defense resembling member. Training data generated by each of the training apparatuses may be collected and sent to the central controller.

In some aspects, the plurality of training apparatuses in the system for training the sports player may comprise one master training apparatus that is communicatively coupled with the central controller and with the rest of the plurality of training apparatuses. In this arrangement the central controller sends configuration data and receives training data from a single training apparatus (the master), which may be beneficial when the range of the communication network requires close proximity between the central controller and the training apparatus. The master training apparatus may send respective configuration data to the rest of the plurality of training apparatuses, either to each training apparatus directly or by sending to a nearby training apparatus which in turn sends the configuration data to the destined training apparatus when the master training apparatus and the destined training apparatus are spaced too far apart. Training data may be received at the master training apparatus from each of the training apparatus in a similar manner. The master training apparatus may aggregate the training data and send the aggregated data to the central controller for analysis, or the master training apparatus may analyze the aggregated data prior to transmission.

A method of training a sports player is disclosed for configuring a plurality of training apparatuses and collecting data therefrom.

Certain aspects of the disclosure and figures have been described and/or are represented as being associated with hockey training. However, as will be appreciated by a person skilled in the art in view of the disclosure, the use of the training apparatus, systems, and methods for training a sports player in the context of hockey training represents only one embodiment of the disclosure and the training apparatus, systems, and methods disclosed herein are not limited to such use.

Embodiments are described below, by way of example only, with reference to FIGS. 1-12.

FIG. 1 shows a side view of a training apparatus 100 in accordance with some aspects of the present disclosure. The training apparatus 100 may be used for training a sports player and is placed on a training surface 102 when in use.

The training apparatus 100 comprises an obstacle member 110 that defines a pass-under area 150 for a sport-projectile to pass through when in use. Specifically, the obstacle member 110 of the training apparatus 100 does not permit a sport-projectile to pass there-through, while the pass-under area 150 is an area that is intended for the sports player to slide, kick, or otherwise move the sport-projectile there-through. The obstacle member 110 comprises a support portion 112 that is in contact with the training surface 102 and supports the training apparatus 100 and the obstacle member 110 on the training surface 102. The obstacle member 110 further comprises a pass-under portion 114 that is not in contact with the training surface 102 and is supported by the support portion 112. More particularly, the obstacle member 110 is designed so that the pass-under portion 114 is supported at a height above the training surface 102 that is sufficient to allow a sport-projectile to pass between the training surface 102 and a lower surface 113 of the obstacle member 110 when in use. Accordingly, the height of the pass-under portion 114 above the training surface 102 may vary depending on the type of sport-projectile used by the sports player that is undergoing training. If the training apparatus 100 is used for training a soccer player, for example, the height of the pass-under portion 114 may need to be higher above the surface than if the training apparatus 100 is used for training a hockey player. Further, the thickness of the pass-under portion 114 may vary. It may be desirable in accordance with certain drills for the player to pass/kick a puck/ball over the pass-under portion 114, and the thickness and/or height of the pass-under portion 114 may be modifiable to change the height of an upper surface 115 of the pass-under portion 114 above the training surface 102. In some embodiments, the structure of the obstacle member 110 may be adjustable to adjust the height of the pass-under portion 114 above the training surface 102.

As seen in FIG. 1, the obstacle member 110 may not necessarily encompass the pass-under area 150 in a longitudinal direction of the obstacle member 110. That is, provided that the pass-under portion 114 can be sufficiently supported by the support portion 112 at the desired height above the training surface, the support portion 112 may only contact the training surface 102 at one end of the obstacle member 110. Alternatively, as indicated by the dashed lines in FIG. 1 the support portion 112 may contact the training surface 102 at both ends of the obstacle member 110, i.e., the support portion includes the support portion 112 and the support portion 112', which may encompass several structural variations, including, for example, another area/opening for a sport projectile to be passed through.

Furthermore, several possible attachments (not shown) may be attached to the obstacle member 110 and configured in the pass-under area 150. The attachments may restrict an area for the sport projectile to be passed through. For example, an attachment may comprise a solid member with a small rectangular opening just large enough for a hockey puck to pass through, or a solid member with a circular opening for a soccer ball to pass through. Sensor configuration, as further discussed below, may need to be appropriately modified depending on the use of attachments. Alternatively, the support portion 112 and the pass-under portion 114 of the obstacle member 110 may be designed to provide more restrictive pass-under areas 150 in terms of size and/or shape without the requirement of attachments.

The training apparatus 100 further comprises a controller 120 that is used to dynamically control elements of the training apparatus 100, including controlling the elements in response to player behaviour and/or received instructions from a central controller, as described in more detail herein. The controller 120 may also be used to generate and compile player training data, which can then be analyzed to further refine the sports player's skills, as described in more detail herein.

When the training apparatus 100 is used for training a sports player, such as upon execution of a training drill, the sports player may pass a sport-projectile through the pass-under area 150 by passing the sport-projectile from one side of the obstacle member 110, underneath the pass-under section 114, and to an opposite side of the obstacle member 110. The training apparatus 100 comprises a sensor 130 that is configured to detect the sport-projectile passing through the pass-under area 150 when in use. The sensor 130 may comprise, for example, a pair of optical sensors, as described further with reference to FIGS. 3A and 3B, however the sensor 130 is not limited to such. For example, the sensor 130 may also comprise a camera, a proximity sensor, ultrasonic sensor, or any other sensor that can be configured to detect the sport-projectile passing through the pass-under area 150 and a direction of the sport-projectile's travel.

The controller 120 is coupled with the sensor 130 and is configured to receive data from the sensor 130. Based on the data received from the sensor 130, the controller 120 may determine a pass-through direction of the sport-projectile that passes through the pass-under area 150. Specifically, the controller 120 may determine the pass-through direction by determining through which side of the obstacle member 110 that the sport-projectile enters and from which side of the obstacle member 110 that the sport-projectile exits having been passed through the pass-under area 150. For example, when a sports player is facing along a longitudinal direction of the obstacle member 110 the pass-through direction may be from left to right or from right to left.

As described in more detail herein, the controller 120 comprises a communication interface and may be able to transmit training data to an external device. The training data may comprise an indication of the received sensor data and/or the determined pass-through direction. The controller 120 and/or sensor 130 may also comprise a clock module associated therewith that associates time with the sensor data and that can be included with the training data.

The training apparatus 100 further comprises a lighting fixture 132. The lighting fixture 132 may, for example, comprise a light that can be controlled by the controller 120. The controller 120 may control the lighting fixture 132 to indicate an instructed pass-through direction of the sport-projectile. In some cases, as described with reference to FIGS. 2A and 2B, for example, the lighting fixture 132 may comprise two lights. The controller 120 may control a light of the lighting fixture 132 to be green to indicate an instructed entry side of the sport-projectile passing through the pass-under area 150, and accordingly, an instructed pass-through direction. For example, the controller 120 may control one light of the lighting fixture 132 to be green and the other light to be red. Other lighting fixtures are also possible, such as displaying an arrow or other form of indicator to indicate the instructed pass-through direction, etc.

When the lighting fixture 132 comprises two lights, each light may be associated with a respective side of the training apparatus 100. Accordingly, if the lighting fixture 132 is controlled to indicate a green light on a left side of the training apparatus 100, for example, the sports player is instructed to pass the sport-projectile to enter the pass-under area 150 from the left side of the obstacle member 110, and the instructed pass-through direction is from left to right. Accordingly, the controller 120 can control the lighting fixture 132 to indicate an instructed pass-through direction of the sport-projectile through the pass-under area 150.

The controller 120 may be able to receive configuration data from an external device comprising the instructed pass-through direction. The controller 120 may control the lighting fixture 132 to indicate the instructed pass-through direction based on the configuration data. The controller 120 may also be able to determine if the pass-through direction determined based on the received sensor data is the same as the instructed pass-through direction. Accordingly, the training apparatus 100 may be remotely configurable to instruct a sports player on how to manipulate the sports-projectile. Furthermore, the training apparatus 100 may be able to dynamically determine the player's behaviour and whether the pass-through direction of the sport projectile through the pass-under area 150 was the same as the instructed pass-through direction, which can be useful in assessing the player's skill as well as useful to create a reactive training drill using a plurality of training apparatuses.

The training apparatus 100 may further comprise one or more defense resembling members 134 that is/are rotatably mounted to the obstacle member 110. As shown in FIG. 1, the training apparatus 100 comprises one defense resembling member 134. FIGS. 11A and 11B show an alternative configuration of the training apparatus, where the training apparatus 1100 comprises three defense resembling members 1134a-c rotatably mounted to obstacle member 1110. FIG. 11A shows a top view and FIG. 11B shows an isometric view. In some implementations the defense resembling members may be removable from the obstacle member 1110 such that the number of defense resembling members can be adjusted. The obstacle member 1110 may have a rounded or teardrop shaped end to support the defense resembling members 1134a-c. The rounded end may provide more space to mount multiple defense resembling members. Further, the rounded end may better conform to a player's motion as they move around the end, and accordingly the rounded end at which the defense resembling member(s) is/are attached may also be implemented even if only one defense resembling member is employed.

Figure 11:
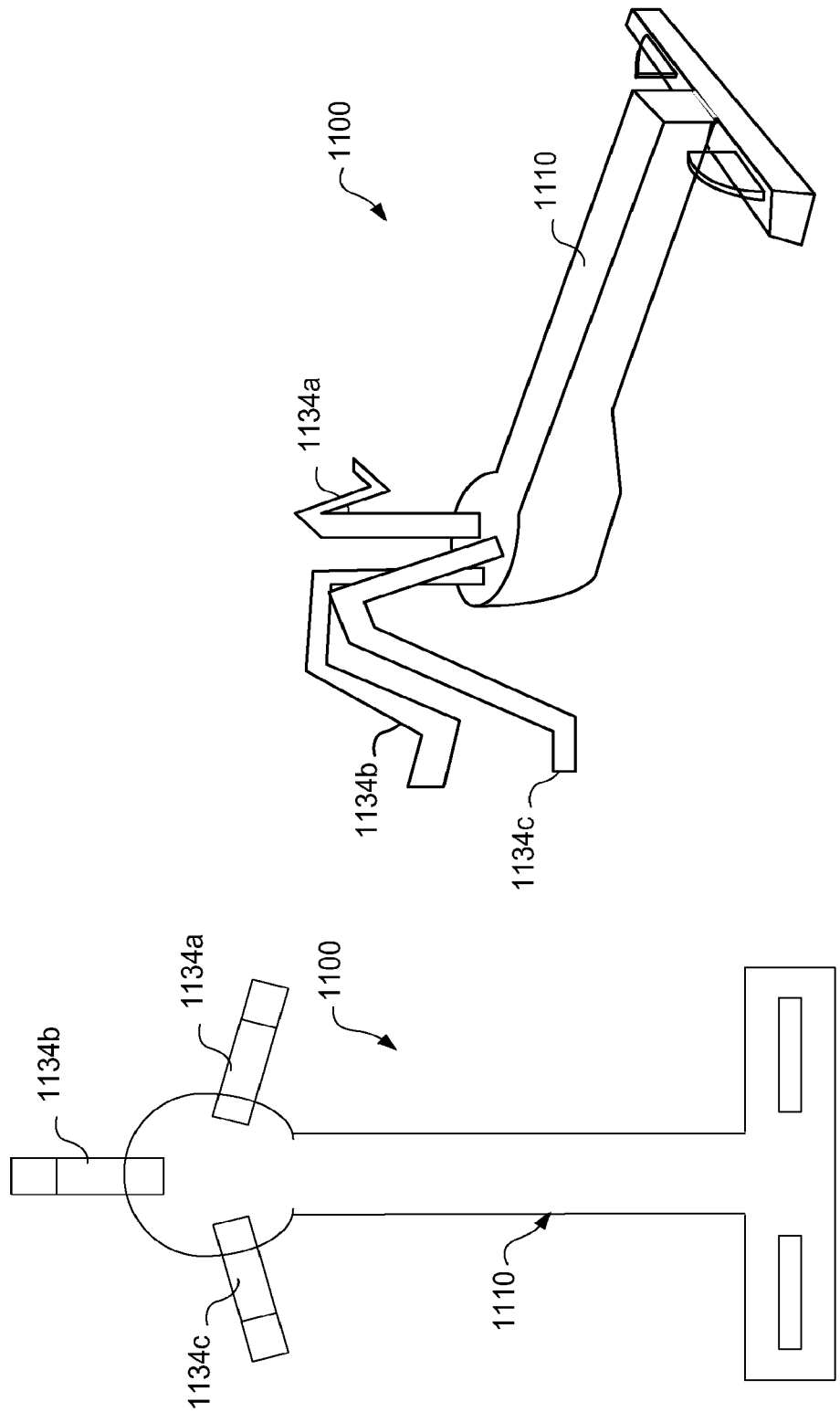
FIGS. 11A and 11B show an alternative configuration of the training apparatus.
Figure 12:
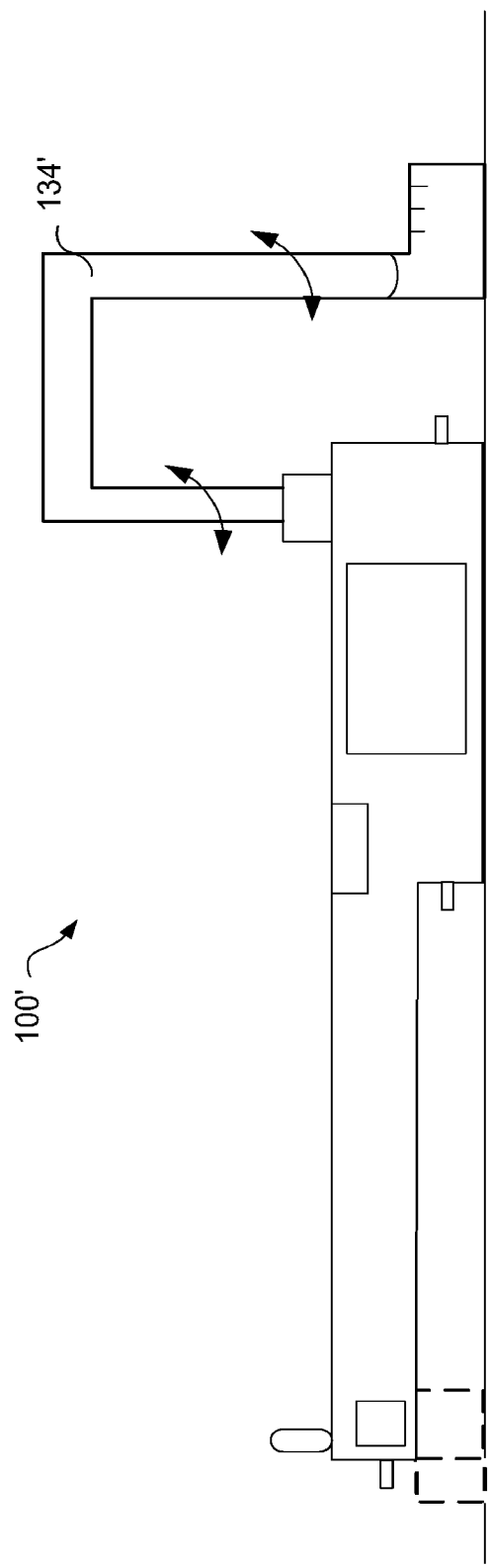
FIG. 12 depicts an alternative training apparatus.

Although the disclosure primarily depicts and refers to training apparatuses comprising a single defense resembling member, it would be readily appreciated that the same features described herein extend to training apparatuses comprising more than one defense resembling member, such as the training apparatus 1100. Furthermore, although the defense resembling member(s) 134/1134a-c is depicted in FIGS. 1 and 11 as a hockey stick resembling member, it is not limited to such. For example, if the training apparatus is to be used for training a soccer player, the defense resembling member(s) 134/1134a-c may resemble a foot/shin of a defender. An alternative training apparatus 100' is depicted in FIG. 12, where the defense resembling member 134' resembles a soccer defender's foot/shin. As still a further modification, the defense resembling member 134' may have a shaft portion that splits into two branches each resembling a foot/shin of a defender.

With reference again to FIG. 1 for the sake of explanation, the defense resembling member 134 may be rotated in a plane parallel to the training surface 102, using an actuation device 136 such as a DC gearhead motor or a stepper motor, for example. The controller 120 may be coupled with the actuation device 136 and control the rotation of the defense resembling member 134.

The controller 120 may receive configuration data that further specifies a desired rotational position of the defense resembling member 134, or where there is more than one defense resembling member, for the defense resembling members individually or collectively. The controller 120 may thus configure the training apparatus 100 in accordance with the configuration data by controlling the actuation device 136 to rotate the defense resembling member 134 to the desired rotational position. Additionally or alternatively, the configuration data may specify desired movement of the defense resembling member, such as a random rotating motion or a rotating motion within a specified range of values. The controller 120 may control the actuation device 136 to rotate the defense resembling member 134 accordingly. Moreover, the controller 120 may be configured to communicate with other training apparatuses, and based on data received from the other training apparatuses the controller 120 may reactively control the actuation device 136 to dynamically rotate the defense resembling member 134.

Each defense resembling member 134 of the training apparatus 100 defines a pass-between area 160 with the obstacle member 110. The pass-between area 160 is an area that is intended for the sports player to slide, kick, or otherwise move the sport-projectile between the defense resembling member 134 and the obstacle member 110 during training. The training apparatus 100 may comprise an additional sensor 138 configured to determine if the sport-projectile passes through the pass-between area 160. The sensor 138 may be a pair of optical sensors, a camera, a proximity sensor, an ultrasonic sensor, etc.

The defense resembling member 134 may have attached thereon an IR illuminator 140. The IR illuminator 140 can serve as another optical gate used in conjunction with the sensor 138 for detecting sports projectiles passing through the pass-between area 160.

The training apparatus 100 may comprise one or more further sensors 142 configured to measure a parameter of the sports player. In FIG. 1, the sensor 142 is depicted as being disposed on the obstacle member 110 and configured to measure a parameter of the sports player that may be approaching the training apparatus 100 from the direction that the sensor 142 is facing. In some examples, the sensor 142 may comprise a LIDAR sensor that is configured to measure a speed of the sports player as they approach the training apparatus. A person skilled in the art will readily appreciate other sensors that could be disposed on the training apparatus 100 to measure various parameters of the sports player and the implementation of such other sensors does not depart from the scope of this disclosure.

The training apparatus 100 may also comprise a means for identifying the sports player that is manipulating the sport-projectile when in use. For example, the training apparatus 100 may comprise a RFID reader 144 that is configured to read RFID tags associated with the sports player. A hockey stick of a hockey player using the training apparatus 100 for training may comprise an RFID tag, and as the hockey player's stick moves close to the obstacle member 110 in order to pass the sport-projectile through the pass-under area 150, the RFID reader 144 can read the RFID tag on the stick. In this manner, any training data generated from the sport-projectile being passed through the pass-under area 150, the pass-between area 160, and from the sports player themselves (e.g. player speed as approaching the training apparatus) can be associated with the player's ID by the controller 120.

The training apparatus 100 and components thereof may be powered in various manners as would be appreciated by a person skilled in the art. In the exemplary training apparatus 100 depicted in FIG. 1, the controller 120 receives electric power from a battery pack 146. The controller 120 may control elements such as the lighting fixture 132 and the actuation device 136 by controlling the power provided thereto using various logical elements (not shown), for example.

The training apparatus 100 may be designed specific to the training surface 102 that the training apparatus 100 is to be placed on when in use. For example, if the training apparatus 100 is to be placed on an ice surface, the training apparatus 100 may comprise spikes for securely contacting the training apparatus with the ice. Likewise, if the training apparatus is to be placed on a grass surface, the training apparatus 100 may also have spikes for securely contacting the training apparatus with the grass.

The training apparatus 100 may also be designed specific to the type of sport and/or sport-projectile that it is intended to be used with. For example, if the training apparatus 100 is to be used for hockey training, the training apparatus 100 should be made to withstand contact with hockey players, hockey sticks, and the puck. In comparison, a training apparatus 100 that is to be used for soccer training may be made of less dense/durable materials because contact with a soccer ball may impart less force on the training apparatus than contact with a hockey puck.

Figure 2A:
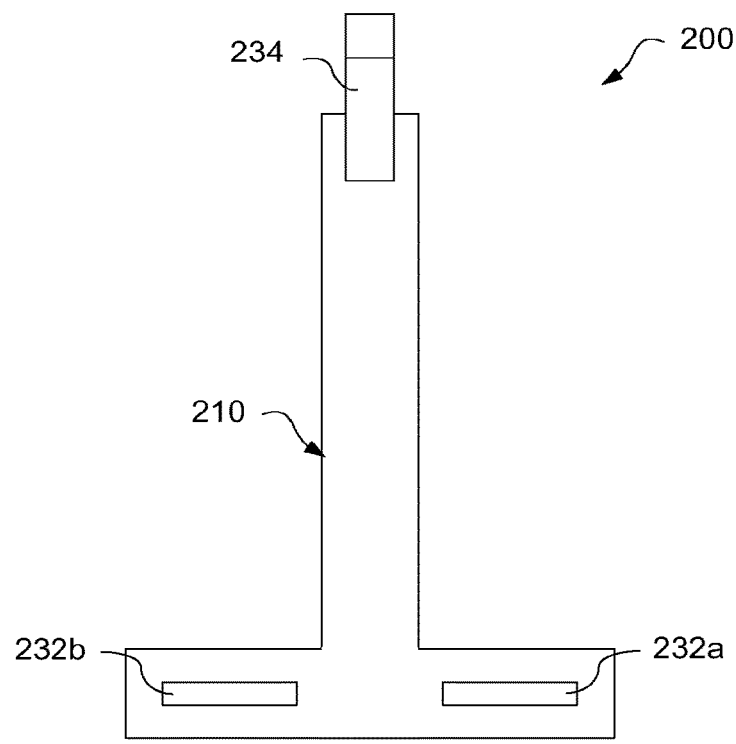
FIG. 2A shows a top view of a training apparatus in accordance with some aspects of the present disclosure.
Figure 2B:
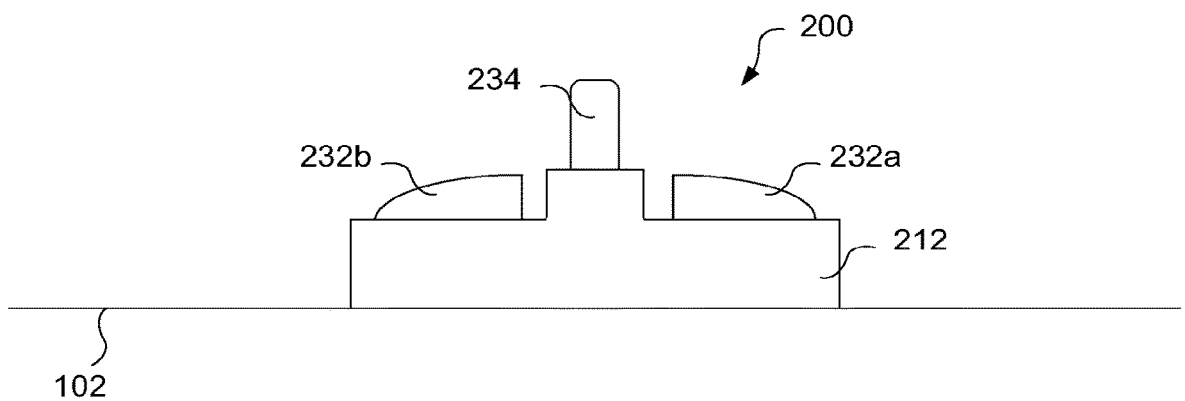
FIG. 2B shows a front view of a training apparatus in accordance with some aspects of the present disclosure.

FIG. 2A shows a top view of a training apparatus 200 in accordance with some aspects of the present disclosure. FIG. 2B shows a front view of a training apparatus 200 in accordance with some aspects of the present disclosure.

The training apparatus 200 depicted in FIGS. 2A and 2B comprises an obstacle member 210 with a support portion 212 at both ends of the obstacle member, a lighting fixture that comprises two lights 232a, 232b, and a defense resembling member 234.

As described with reference to FIG. 1, as the sports player approaches the training apparatus 200 one of the two lights 232a, 232b may be controlled to flash green, for example, indicating a pass-through direction of the sport-projectile through the pass-under area by indicating a side of the obstacle member 210 that the sports player is instructed to pass the sport-projectile from to enter the pass-under area.

FIG. 3A shows an isometric view of a training apparatus 300 configured to detect a sport-projectile in accordance with a first aspect when in use. FIG. 3B shows a top view of the training apparatus 300 configured to detect the sport-projectile in accordance with the first aspect when in use. As seen in FIGS. 3A and 3B, the training apparatus 300 may comprise slightly different structural features than the training apparatuses 100 and 200, all of which are encompassed within the scope of the present disclosure.

The training apparatus 300 depicted in FIGS. 3A and 3B comprises a pair of optical sensors 330a, 330b as the sensor that is configured to detect the sport-projectile 399 passing through the pass-under area 350 when in use. The optical sensors 330a, 330b are depicted as being disposed on support portion 312 of the obstacle member 310, however the location of the optical sensors 330a, 330b is not limiting provided that the sensors can detect the sport-projectile passing through the pass-under area 350. For example, the optical sensors 330a, 330b can be located at respective ends of the support portion 312, on a lower surface of the pass-under portion 314, etc.

When the pair of optical sensors 330a, 330b is employed for detecting the sport-projectile 399 passing through the pass-under area 350, the controller 320 of the training apparatus 300 may receive the sensor data and determine a pass-through direction of the sport-projectile 399 based on the sensor that first detects the sport-projectile. For example, with particular reference to FIG. 3B it is clear that the pass-through direction of the sport-projectile 399 is from left to right because the sport-projectile 399 enters the pass-under area 350 through the left side of the obstacle member 310 and exits from the right side of the obstacle member 310. The controller 320 makes this determination from the sensor data received from the optical sensors 330a, 330b because the optical sensor 330a, which is disposed to the left of the optical sensor 330b, would detect the sport-projectile 399 first. The controller 320 may also determine that the sport-projectile 399 has successfully passed through the pass-under area 350 in a left-to-right pass-through direction when the received sensor data indicates the following sequence: (i) the sport-projectile 399 is detected by the optical sensor 330a; (ii) the sport-projectile 399 is detected by the optical sensor 330b; (iii) the sport-projectile 399 is no longer detected by the optical sensor 330a; and (iv) the sport-projectile 399 is no longer detected by the optical sensor 330b. The controller 320 may also determine a passing speed of the sport-projectile 399 as it passes through the pass-under area 350 based on a time between the sport-projectile being detected by the optical sensor 330a and detected by the optical sensor 330b.

Although FIGS. 3A and 3B have been described with regards to detection of the sport-projectile 399 passing through the pass-under area 350 using a pair of optical sensors 330a, 330b, a person skilled in the art will readily appreciate that the sport-projectile 399 could be detected passing through the pass-under area 350 using various other sensors and/or camera devices. As previously described with reference to FIG. 1, the sensor to detect the sport-projectile 399 passing through the pass-under area 350 may comprise a camera, and the controller 320 may determine a pass-through direction and passing speed of the sport-projectile 399 based on consecutive images taken by the camera. The sensor used to detect the sport-projectile 399 passing through the pass-under area 350 may also comprise a proximity sensor or pair of proximity sensors, and the controller 320 may determine a pass-through direction and passing speed of the sport-projectile 399 based on the received sensor data indicating a gradual strengthening and subsequent weakening of an electrical signal produced by the sensor(s).

The training apparatus 300 further comprises a lighting fixture that comprises two lights 332a, 332b. As has been previously described, the controller 320 may control the lighting fixture to indicate an instructed pass-through direction. In the depicted example of FIGS. 3A and 3B, if the light 332a was green, the controller 320 would determine that the pass-through direction of the sport-projectile 399 was the same as the instructed pass-through direction because the light 332a is disposed on the left side of the training apparatus 300 (indicating an instructed pass-through direction of left to right) and the sport-projectile 399 entered the pass-under area 350 through the left side of the obstacle member 310 and exited from the right side of the obstacle member 310 (indicating a pass-through direction of left to right). However, if the light 332b was green and/or if the light 332a was red, the controller 320 would determine that the pass-through direction of the sport-projectile 399 was not the same as the instructed pass-through direction.

Figure 4:
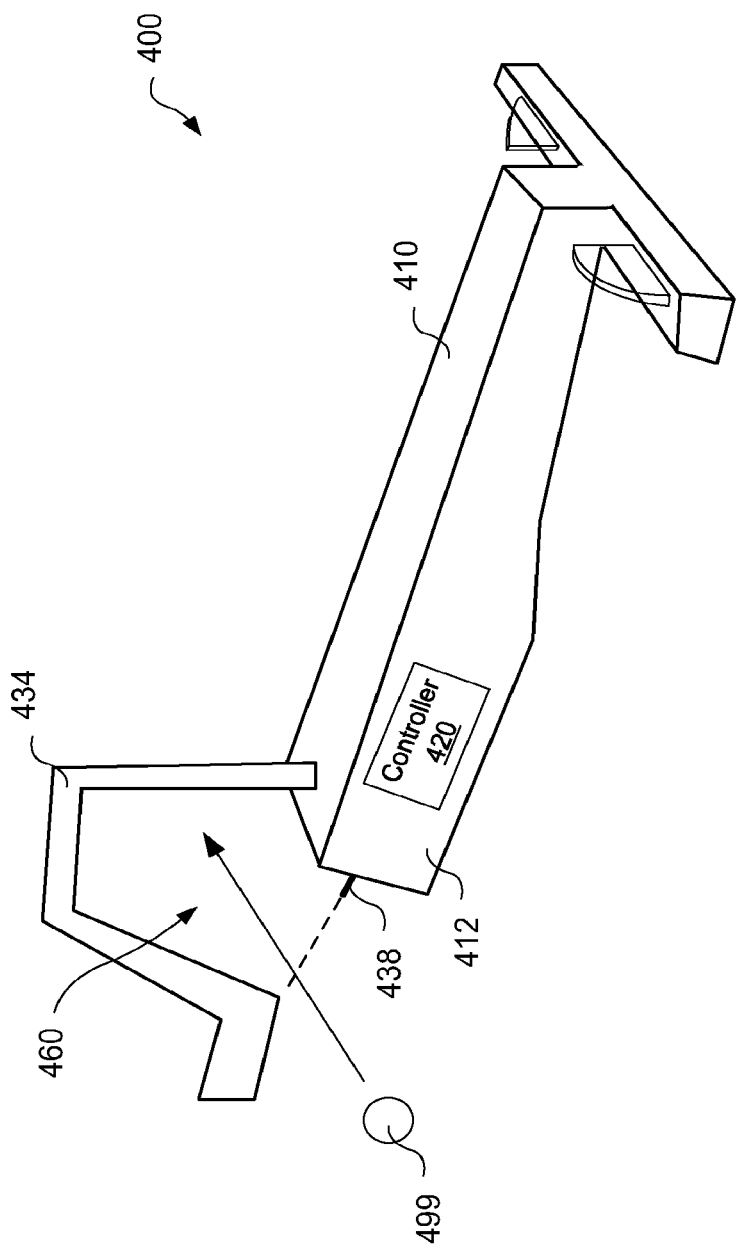
FIG. 4 shows an isometric view of a training apparatus configured to detect a sport-projectile in accordance with a second aspect when in use.

FIG. 4 shows an isometric view of a training apparatus 400 configured to detect a sport-projectile in accordance with a second aspect when in use. As depicted in FIG. 4, the training apparatus 400 comprises an optical sensor 438 configured to detect the sport-projectile 499 passing through the pass-between area 460, which is the area between the defense resembling member 434 and the obstacle member 410. The optical sensor 438 is depicted as being disposed on support portion 412 of the obstacle member 410, however the location of the optical sensor 438 is not limiting provided that the sensor can detect the sport-projectile passing through the pass-between area 460. For example, the optical sensor 438 can be located on the defense resembling member 434.

The controller 420 of the training apparatus 400 may receive data from the optical sensor 438 and determine whether sport-projectile 499 has passed through the pass-between area 460. As an alternative to using an optical sensor to detect whether sport-projectile 499 has passed through the pass-between area 460, other sensors and/or camera devices may be used such as a camera, proximity sensor, ultrasonic sensor, etc.

Although FIG. 4 has been described with regards to detection of the sport-projectile 499 passing through the pass-between area 460, it would be readily appreciated that a sensor configuration could be used that is similar to that described with reference to FIGS. 3A and 3B so as to determine a direction of the sport-projectile 499 as it passes through the pass-between area 460 as well.

Furthermore, the training apparatus 400 may comprise more than one defense resembling member 434, as has been described with reference to FIGS. 11A and 11B. In this case, there would be more than one pass-between area 460 (one for each defense resembling member) and there may be an optical sensor or other type of sensor configuration at each of the pass-between areas. A player may execute a drill by moving the sport-projectile through some or all of the pass-between areas, and more data could be generated by the sensors 438 which can be synced together to allow for better analysis of player performance and motor skill development. More than one defense resembling member 434 may therefore allow for more complicated training drills and increased difficulty, along with more sensor data collected.

Figure 5:
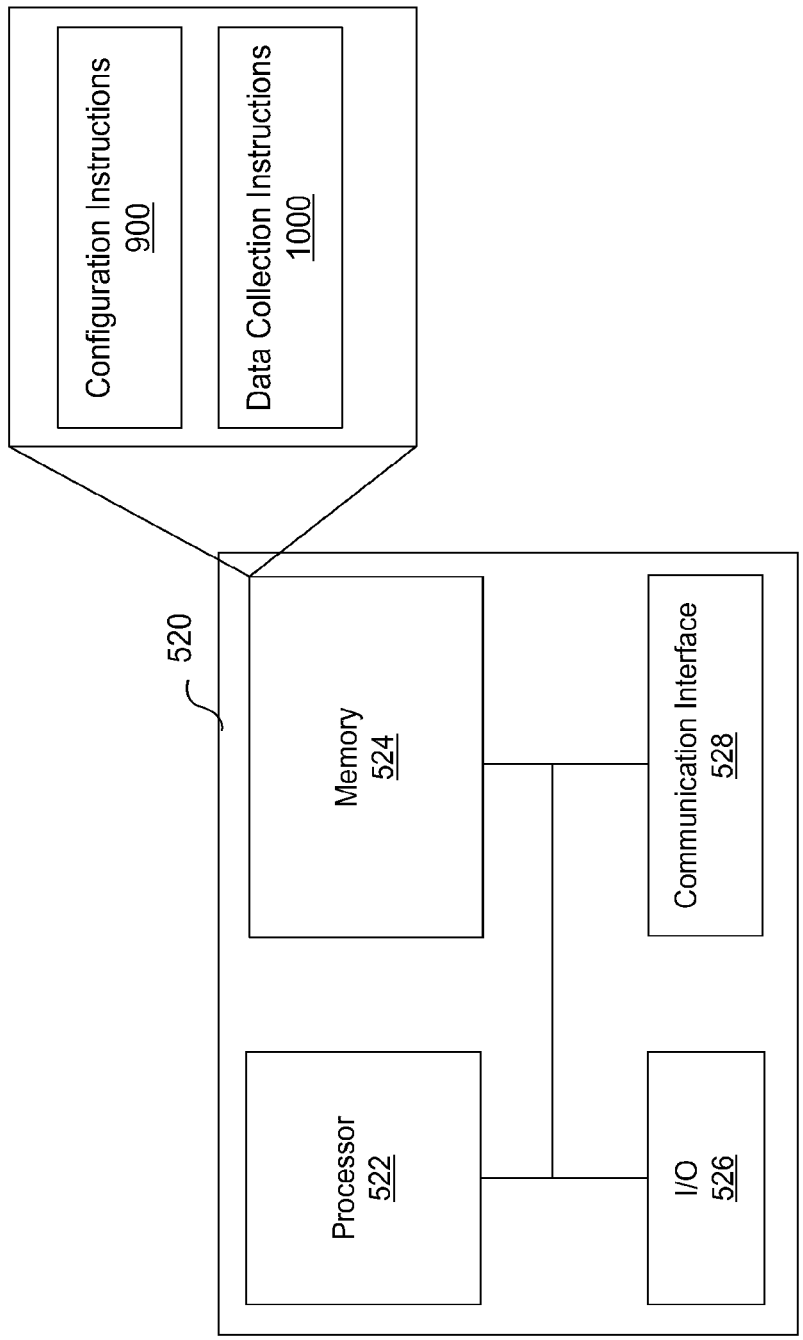
FIG. 5 shows a schematic representation of a controller associated with the training apparatus.

FIG. 5 shows a schematic representation of a controller associated with the training apparatus. The controller 520 may be used in any of the previously described training apparatuses 100, 200, 300, or 400 and may be implemented as any of the previously described controllers 120, 320, or 420.

The controller 520 comprises a processor 522, a memory 524, an input/output (I/O) interface 526, and a communication interface 528, all of which are operably coupled with one another (for example, electrically connected directly or through a bus (not shown)). The memory 524 may be a non-transitory storage medium that is readable by the processor 522 and which comprises instructions that may be executed by the processor 522. As depicted in FIG. 5, the memory 524 may store instructions 900 for configuring one or more training apparatuses (as described in more detail with reference to FIG. 9) and instructions 1000 for collecting data from one or more training apparatuses (as described in more detail with reference to FIG. 10). The memory may also store instructions (not shown) for storing and/or analyzing received data. The memory may also store training data until the data is sent to an external device/central controller.

The I/O interface 526 provides a physical interface for coupling the controller 520 (and hence processor 522) with various equipment. With reference to the components of the training apparatus described with reference to FIG. 1, the I/O interface 526 may provide the interface for coupling the controller 520 with the sensors 130, 138, and/or 142, the lighting fixture 132, the actuation device 136, the power supply (e.g. battery pack 146), etc. The processor 522 may receive data from said components through the I/O interface 526 and access the memory 524 to determine how to process the received data. The processor 522, based on the instructions stored in the memory 524, may generate signals that are sent to the various components through the I/O interface 526, such as controlling power to the lighting fixture 132 to indicate an instructed pass-through direction and controlling power to the actuation device to cause rotation of the defense resembling member 134.

The controller 520 further comprises a communication interface 528 that allows for connection and communication over a communication network(s). Specifically, the communication interface 528 may allow the controller 520 to communicate with a central controller and/or controllers of other training apparatuses, providing an interface for the controller 520 to receive configuration data and to transmit training data. In some instances, as described in more detail with reference to FIG. 6 for example, communication between the controller 520 and a central controller may take place over a different communication network than communication between the controller 520 and a controller of another training apparatus. The communication interface 528 may therefore provide for communication over different types of communication networks in accordance with different protocols. In some examples, the communication interface 528 may comprise a Bluetooth™, Zigbee™ and/or a WiFi™ transceiver.

Figure 6:
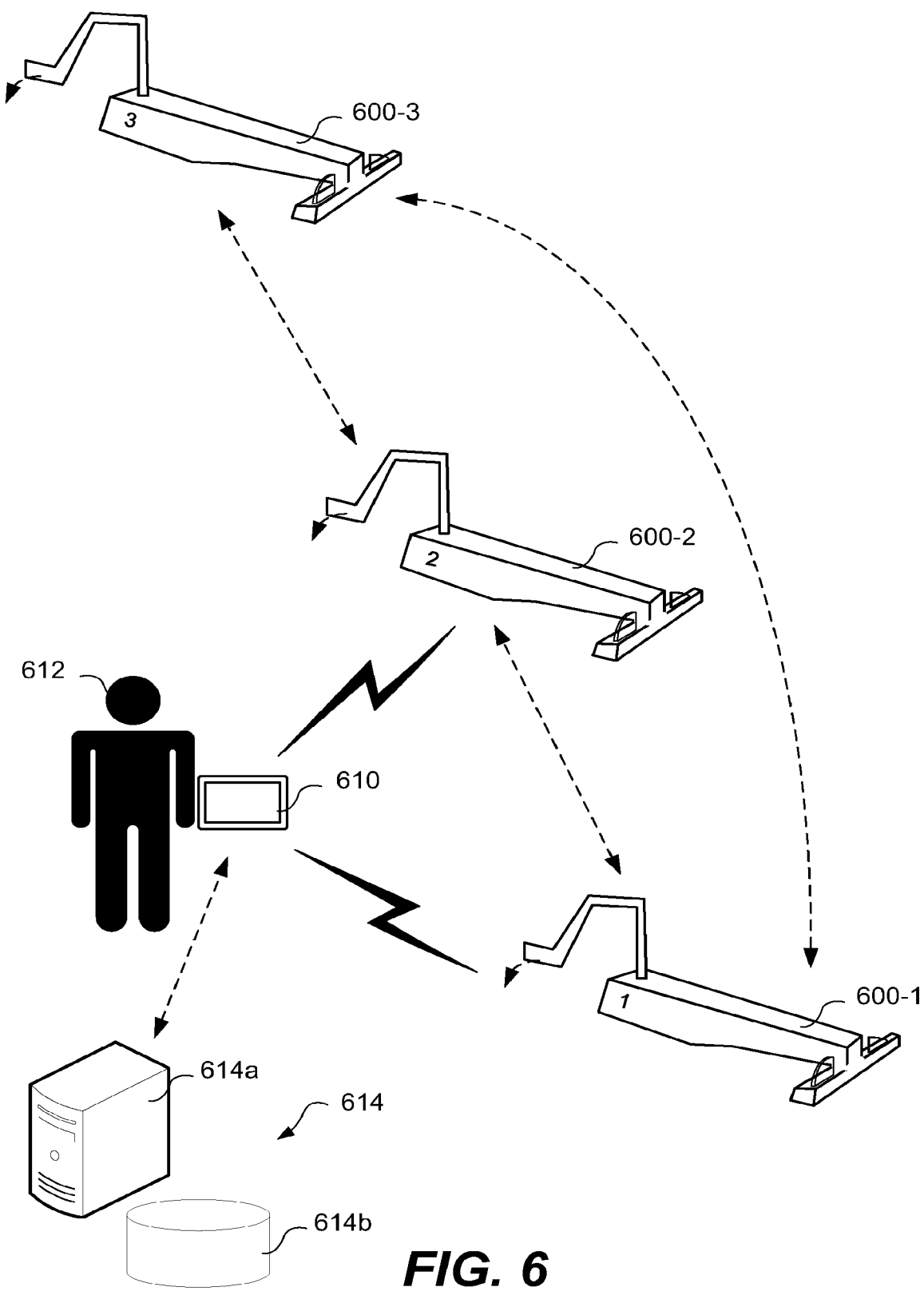
FIG. 6 shows a system for training a sports player in accordance with some aspects of the present disclosure.

FIG. 6 shows a system for training a sports player in accordance with some aspects of the present disclosure. The system for training a sports player comprises a plurality of training apparatus which are depicted in FIG. 6 as comprising three training apparatuses 600-1, 600-2, and 600-3. As depicted by the broken line arrows the three training apparatuses 600-1, 600-2, and 600-3 are communicatively coupled with one another, for example, via the communication interface of their respective controllers as described with respect to FIG. 5.

At least one of the training apparatuses may be communicatively coupled with a central controller, which is depicted as a tablet 610 that is associated with a coach 612 training the sports player. As depicted in FIG. 6, the training apparatuses 600-1 and 600-2 are communicatively coupled with the tablet 610. In some aspects of the present disclosure, the communication protocol used to exchange data between the training apparatuses 600-1, 600-2 and the tablet 610 may be different than the communication protocol that is used to exchange data between the training apparatuses 600-1, 600-2, 600-3. For example, communication between the tablet 610 and the training apparatuses 600-1, 600-2 may be over Bluetooth™' while communication between the training apparatuses 600-1, 600-2, and 600-3 may be over Zigbee™. It is noted that the central controller is not limited to tablet 610 and may be implemented as any type of portable computing device, for example. Moreover, while the description makes reference to a coach 612 of the sports player that controls the tablet 610, the sports player themselves, a parent, friend, etc., may instead control the central controller/tablet 610, with appropriate authorization to do so.

The coach 612 may use the tablet 610 to remotely configure the plurality of training apparatuses 600-1, 600-2, and 600-3 to define a training drill to be executed by the sports player. The training apparatuses may receive configuration data from the tablet 610 that may include an instructed pass-through direction to be indicated by a lighting fixture of respective training apparatuses 600-1, 600-2, and 600-3, and may further include a desired start position as a rotational position of the defense resembling member. As depicted in FIG. 6, each of the training apparatuses 600-1, 600-2, and 600-3 may be identifiable by a number associated therewith (e.g. the training apparatuses 600-1, 600-2, and 600-3 may be serialized), which helps the coach to remotely configure the plurality of training apparatuses 600-1, 600-2, and 600-3. Specifically, the coach 612 may access a software application running on the tablet 610 and input configuration parameters for respective of the training apparatuses 600-1, 600-2, and 600-3. The application on the tablet 610, based on the user input from the coach 612, generates the configuration data and transmits the configuration data to at least one of the training apparatuses that the tablet 610 is communicatively coupled with. The application will allow the coach to select specific drills, using various quantities of units, configurations of lights (e.g. flashing, solid) and stick position (e.g. static or in motion). Once data collection starts, a corresponding table of timing results can be generated to show the intervals between different gates/units. The software may be continuously configurable/developed to add new drills and corresponding results tables.

As an example, the coach 612 may arrange the plurality of training apparatuses 600-1, 600-2, and 600-3 on the training surface in preparation for the sports player to execute a training drill and power on the training apparatuses 600-1, 600-2, and 600-3 (by inserting the battery pack, for example). The coach 612 may access the application running on the tablet 610 and initiate communication with at least one of the training apparatuses 600-1, 600-2, and 600-3. In some aspects of the present disclosure, the tablet 610 may initiate communication with a dedicated 'master' training apparatus among the plurality of training apparatuses, for example, training apparatus 600-1. In other aspects, the 'master' training apparatus may change depending on proximity to the tablet 610, or may be determined or selected during setup. The tablet 610 may broadcast a connection signal and connect with the nearest training apparatus. Accordingly, each of the plurality of training apparatuses 600-1, 600-2, and 600-3 may be configured to communicate with both each other and with the tablet 610, or alternatively only one training apparatus may be configured to communicate with both the other training apparatuses and the tablet 610 while the remaining training apparatuses are only configured to communicate with each other.

Once the communication between the tablet 610 and the master training apparatus (referred to for the sake of example as training apparatus 600-1), the master training apparatus 600-1 may search for nearby training apparatuses and establish a connection with those nearby training apparatuses (i.e. training apparatus 600-2 and 600-3 of FIG. 6), thereby forming a communicatively coupled system of training apparatuses as the plurality of training apparatuses. The master training apparatus 600-1 may send information describing the plurality of training apparatuses to the tablet 610, such as the respective training apparatus numbers to identify the available training apparatuses for configuration, location of the training apparatuses on the training surface, etc., thereby providing to the coach 612 information necessary for the coach 612 to remotely configure the plurality of training apparatuses 600-1, 600-2, and 600-3 in accordance with the training drill to be performed by the sports player.

The tablet 610 may also be operably coupled with a data storage system 614, which is depicted as comprising a server 614*a* and a database 614*b*. The tablet 610 and the data storage system 614 may be coupled with one another via the Internet, for example. In some aspects, the database 614*b* may store a plurality of predefined drills based on the number of training apparatuses available to be configured and their arrangement (e.g. location) on the training surface. The coach 612 may select at the application running on the tablet 610 one of the predefined drills to configure the training apparatuses 600-1, 600-2, and 600-3. Additionally or alternatively, the coach 612 may manually select configuration parameters of the training apparatuses 600-1, 600-2, and 600-3.

Configuration data is sent from the tablet 610 to the master training apparatus 600-1. The master training apparatus 600-1 identifies from the configuration data received from the tablet 610 relevant configuration data for respective of the remaining training apparatuses 600-2, 600-3. The master training apparatus 600-1 transmits the relevant configuration to the respective training apparatuses 600-2 and 600-3. In some cases (when each of the training apparatuses 600-1, 600-2, and 600-3 are in close proximity for example), the master training apparatus 600-1 sends relevant configuration data to training apparatus 600-2, and separately sends relevant configuration data to training apparatus 600-3. However, the training apparatuses 600-1, 600-2, and 600-3 may not all be individually connected with one another (when the training apparatuses 600-1, 600-2, and 600-3 are spaced further apart, for example, and depending on the type of communication network over which the training apparatuses are connected). In this case, the master training apparatus 600-1 may send relevant configuration data for both training apparatuses 600-2 and 600-3 to the training apparatus 600-2. The training apparatus 600-2 may in turn send the relevant configuration data to the training apparatus 600-3.

Based on the relevant configuration data, the controller for each of training apparatus 600-1, 600-2, and 600-3 configures the respective training apparatus in preparation for the training drill. As depicted in FIG. 6, each of the training apparatuses 600-1, 600-2, and 600-3 are configured to rotate the defense resembling member in a specified direction, to a desired start positioning, for example. Alternatively, the training apparatuses may be configured to start rotating their respective defense resembling members in a random or non-random motion. Further, as has been previously described the lighting fixture of respective training apparatuses 600-1, 600-2, and 600-3 may be controlled to indicate an instructed pass-through direction for the sport-projectile to pass through the pass-under area. In addition, the configuration data may configure the clock module of each training apparatus to synchronize prior to beginning the drill, thereby providing a common time among the training apparatus for use in analyzing training data received from multiple training apparatuses.

Figure 7:
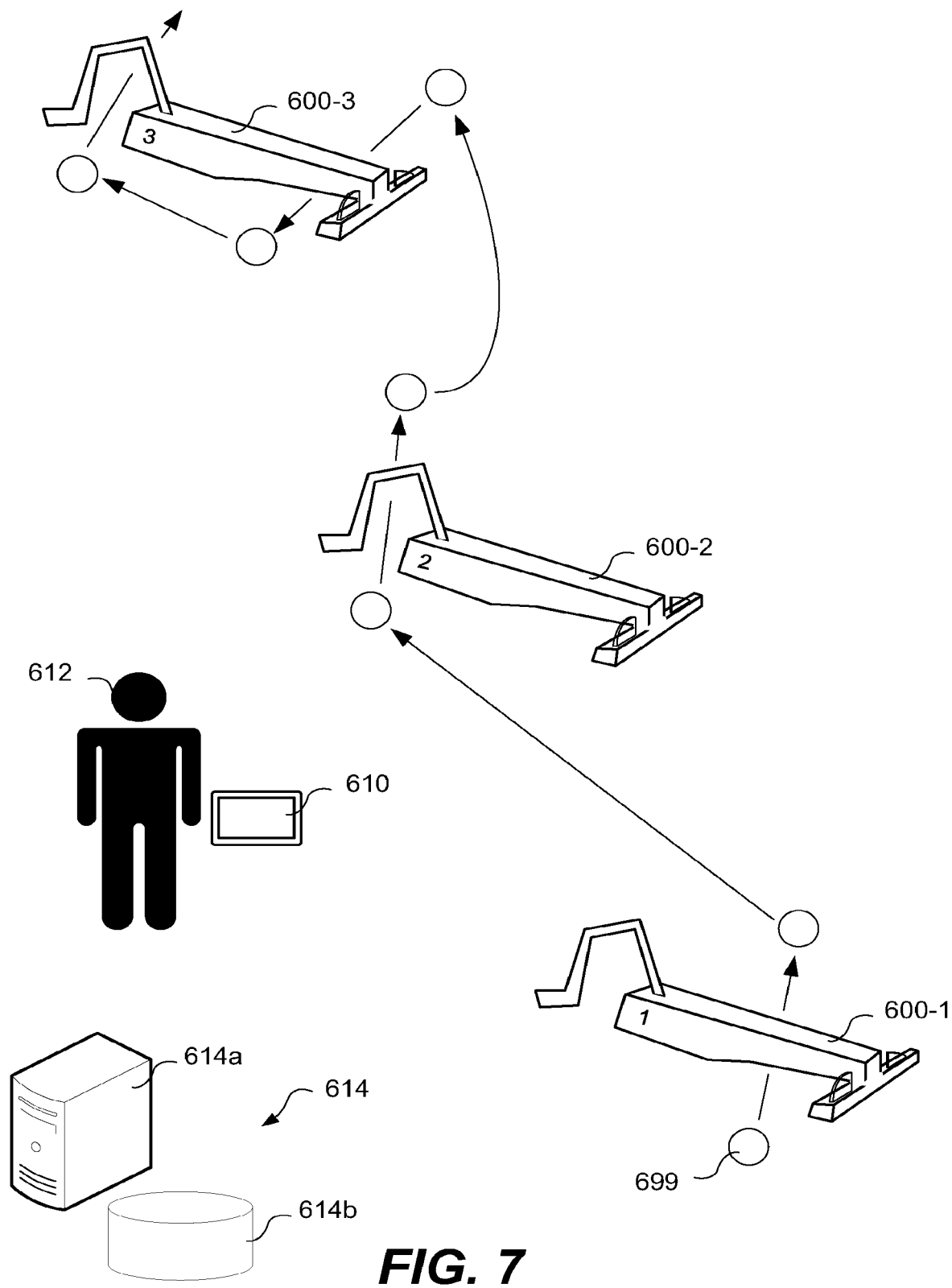
FIG. 7 shows a representation of a sport-projectile being manipulated during execution of a training drill.

FIG. 7 shows a representation of a sport-projectile being manipulated during execution of a training drill. As depicted in FIG. 7, the sports player when executing the training drill manipulates the sport-projectile 699 around the plurality of training apparatuses 600-1, 600-2, and 600-3. The sports player may manipulate the sport-projectile 699 to pass through the pass-under area (as depicted for training apparatus 600-1), to pass through the pass-between area (as depicted for training apparatus 600-2), and/or to pass through the pass-under area and the pass-between area (as depicted for training apparatus 600-3). As has been previously described, the lighting fixture on the training apparatuses 600-1, 600-2, and 600-3 may indicate an instructed pass-through direction of the sport-projectile 699 through the pass-under area (or possibly no pass-through direction if the sport-projectile 699 is not intended to be passed through the pass-under area).

While the sports player is executing the drill, each of the training apparatuses 600-1, 600-2, and 600-3 generate training data. For example, the training data may comprise data indicating whether the sport-projectile 699 has passed through the pass-under area, how fast the sport-projectile 699 was travelling when it passed through the pass-under area, whether a determined pass-through direction of the sport-projectile 699 through the pass-under area matches the instructed pass-through direction, whether the sport-projectile 699 passed through the pass-between area, how fast the sports player was moving when they approached the training apparatus, time between the sport-projectile being detected at consecutive training apparatuses, etc., using various sensors associated with the training apparatuses 600-1, 600-2, and 600-3 that provide sensor data and associated time data as has been previously described. Furthermore, as has also been previously described, one of the training apparatuses may have a means to identify the sports player, such as an RFID reader that is used to read a corresponding RFID tag associated with the sports player. Accordingly, all of the training data generated when the sports player executes the training drill may be associated with the sports player.

Additionally or alternatively, the system for training the sports player may further comprise a starting gate that may be placed ahead of the training apparatuses and may also define a pass-under area that the sports player first passes the sport-projectile 699 through (not shown in FIG. 6 or 7). The starting gate may comprise an RFID reader, for example, to initially identify the sports player which may have an RFID tag affixed to their stick or other piece of equipment for use in identifying the player. The starting gate may comprise additional elements such as a sensor to detect the sport-projectile 699 and which may be used to indicate that the execution of the drill has started. For example, the starting gate may comprise a single IR beam which when the beam is broken indicates start of the drill. A clock module may be associated with the sensor to provide a start time of the training drill, and the clock module can be synched with the training apparatuses. The starting gate may comprise a controller similar to the controller of the training apparatuses and is communicatively coupled with the training apparatuses and/or the tablet. The starting gate may further comprise a lighting fixture that may be used to indicate when the drill is ready to begin and/or the training apparatuses are appropriately configured. The starting gate may still further comprise an LCD display for displaying information to the player. For example, once the player has been identified through the RFID tag/reader the player information may be displayed for confirmation. The player information can then be appended to timing data and other data associated with the sensors of various training apparatuses for recordation and analysis.

In some embodiments the training data from one of the training apparatuses may be dynamically sent to one or more of the other training apparatuses for which the sports player has not yet approached. For example, consider that the instructed pass-through direction of the first training apparatus 600-1 was to pass the sport-projectile 699 through the pass-under area from left to right, but it is determined that the sports player passed the sport-projectile 699 through the pass-under area from right to left. The second training apparatus 600-2 may have been configured for the instructed pass-through direction to be indicated as right to left, however if the second training apparatus 600-2 receives training data from the first training apparatus 600-1 indicating that the determined pass-through direction for the first training apparatus was from right to left, the second training apparatus 600-2 may dynamically control the lighting fixture to indicate a modified pass-through direction to be from left to right based on the event that occurred at the first training apparatus. In this manner, the plurality of training apparatuses 600-1, 600-2, and 600-3 may also be reactive as the sports player is performing the training drill.

With reference again to FIG. 6, the training data from each of the plurality of training apparatuses 600-1, 600-2, and 600-3 (and the starting gate if the starting gate is used) may be sent to the tablet 610 in a similar manner (but reverse direction) of how the configuration data was sent from the tablet to the plurality of training apparatuses 600-1, 600-2, and 600-3. That is, the training apparatus 600-2 and 600-3 may separately send their training data to the master training apparatus 600-1, or the training apparatus 600-3 may send its training data to the next nearest training apparatus (training apparatus 600-2) which in turn sends both sets of training data to the master training apparatus 600-1.

The master training apparatus 600-1 may aggregate the training data for each of the plurality of training apparatuses 600-1, 600-2, and 600-3 and send the aggregated training data to the tablet 610. In some aspects, the master training apparatus 600-1 may be configured to analyse the aggregated training data and send the results of the analysis to the tablet 610, while in other aspects the master training apparatus may simply send the aggregated training data to the tablet 610 for subsequent analysis by the coach 612 (through the application running on the tablet 610, for example).

In a system where a plurality of training apparatuses are used, the aggregated training data may provide additional insights upon analysis than only analyzing the training data from each training apparatus individually. For example, if a first training apparatus detects the sport-projectile being passed through its pass-under area at a first time, and a second training apparatus detects the sport-projectile being passed through its pass-under area at a second time, and the first and second training apparatuses are spaced apart at a known distance, a speed of the sports player during execution of the training drill may be determined.

In the system of FIG. 6, the coach 612 may thus be provided with quantifiable training data for the sports player beyond what the coach can only visually observe. Furthermore, the training data and/or analysis of the training data may be stored at the data storage 614, so that it may later be accessed for further analysis (for example, by the coach and/or the sports player).

While description with reference to FIGS. 6 and 7 has been provided for a system comprising three training apparatuses 600-1, 600-2, and 600-3, a person skilled in the art will readily appreciate the system for training the sports player may comprise any number of training apparatuses. Also, while the training apparatuses 600-1, 600-2, and 600-3 depicted in FIGS. 6 and 7 each have defense resembling members, a person skilled in the art will readily appreciate that the use of such training apparatus is made for the sake of example and different configurations of the training apparatuses are possible.

Figure 8A:
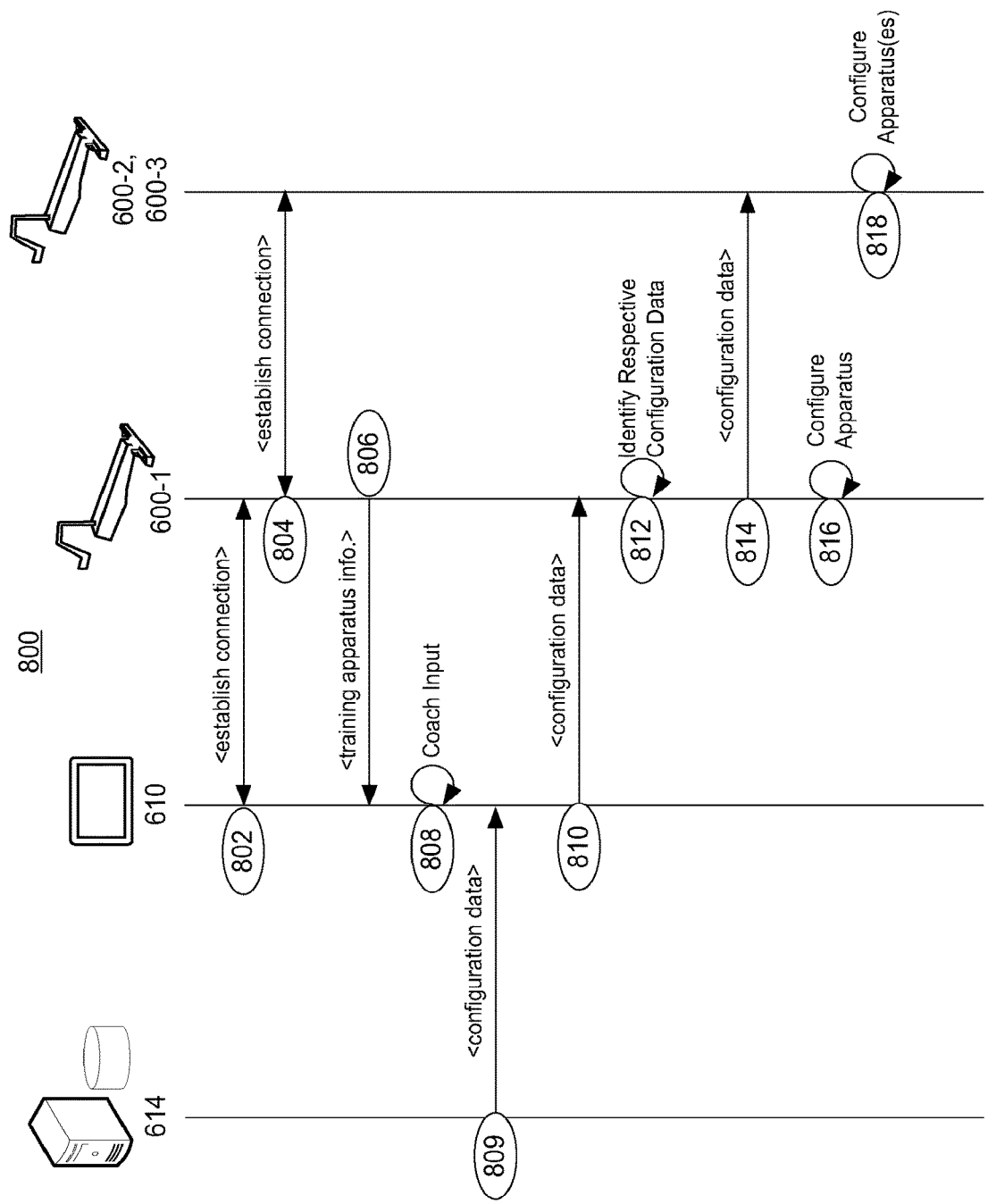
FIGS. 8A and 8B show a communication flow diagram in accordance with some aspects of the present disclosure.
Figure 8B:
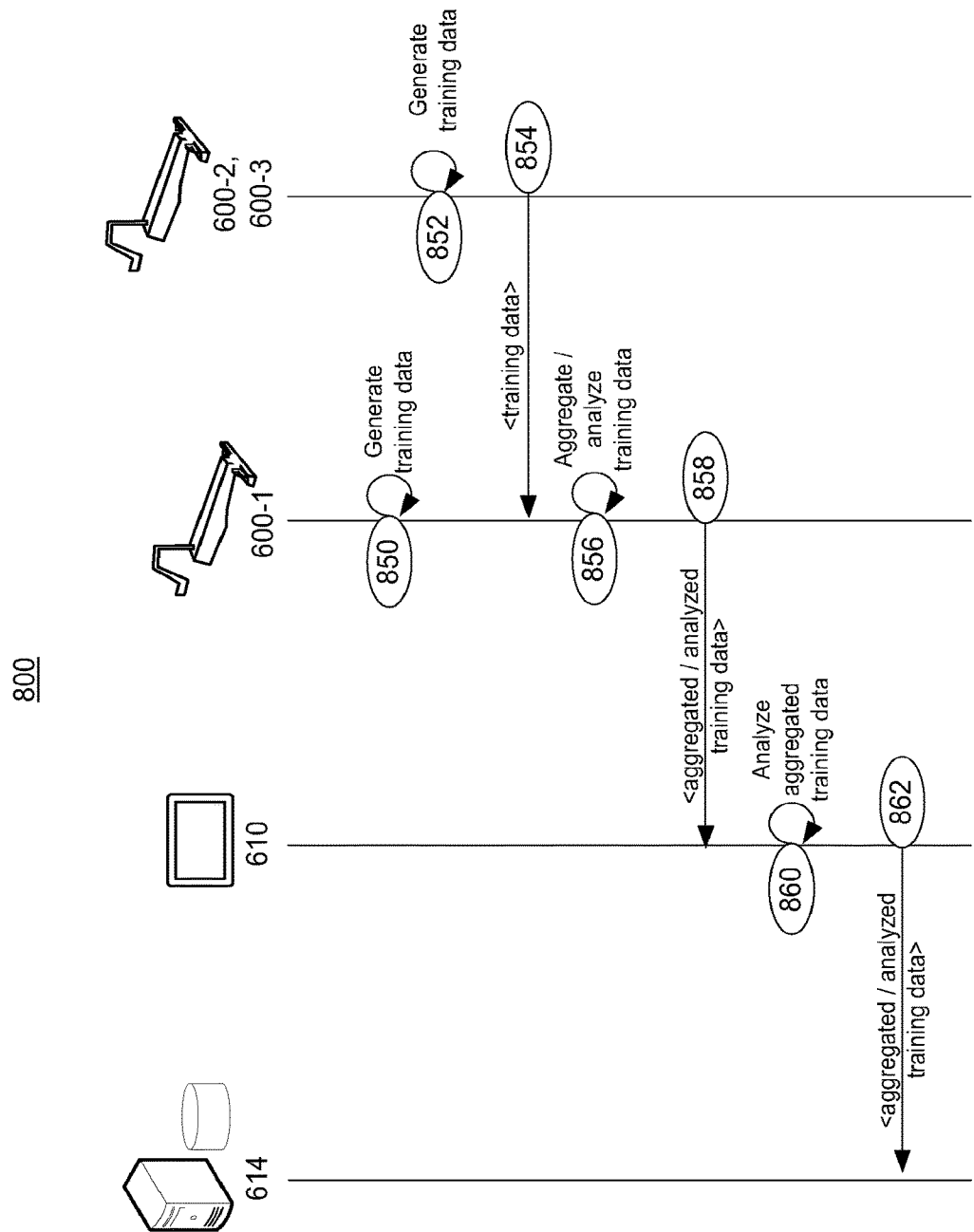

FIGS. 8A and 8B show a communication flow diagram 800 in accordance with some aspects of the present disclosure. Specifically, FIG. 8A depicts a communication flow diagram for remotely configuring a plurality of training apparatuses prior to execution of a training drill by a sports player, and FIG. 8B depicts a communication flow diagram for collecting training data of the sports player upon execution of the training drill. The communication flow diagram 800 is represented with respect to the system described in FIG. 6. In the communication flow diagram 800, arrows are used to denote the direction of the communication and brackets "< >" are used to denote what is being communicated.

Referring to FIG. 8A, a connection is established between the central controller (i.e. tablet 610) and a master training apparatus 600-1 (802). As described with reference to FIG. 6, the master training apparatus 600-1 may be a dedicated master, or alternatively the master training apparatus 600-1 may simply be the closest training apparatus to the tablet 610. The master training apparatus 600-1 searches for nearby training apparatuses and establishes a connection with training apparatuses 600-2, 600-3 (804), thus forming a communicatively coupled system of training apparatuses as a plurality of training apparatuses 600-1, 600-2, and 600-3 able to be configured for a training drill. The master training apparatus 600-1 sends information describing the plurality of training apparatuses to the tablet 610 (806), which may include respective training apparatus numbers to identify the available training apparatuses for configuration, location of the training apparatuses on the training surface, etc.

A coach/user of the tablet 610 inputs a configuration command for the plurality of training apparatuses (808), using an application running on the tablet 610 for example. Based on the input, configuration data for the plurality of training apparatuses is generated and transmitted to the master training apparatus 600-1 (810). In some cases, the coach's input may be selecting a predefined drill, and the configuration data for the predefined drill is retrieved from the data storage system 614 (809) for sending to the master training apparatus 600-1.

The master training apparatus 600-1 identifies from the configuration data the respective configuration data for each of the plurality of training apparatus (612). The respective configuration data for the training apparatuses 600-2 and 600-3 are transmitted from the master training apparatus (814). The master training apparatus 600-1 configures its components in accordance with its respective configuration data (816). The training apparatuses 600-2 and 600-3 configure their components in accordance with their respective configuration data (818).

Referring to FIG. 8B, each of the training apparatuses 600-1, 600-2, and 600-3 generate training data during execution of the training drill by the sports player (850, 852). Training data from the training apparatuses 600-2 and 600-3 are transmitted to the master training apparatus 600-1 (854). The master training apparatus 600-1 aggregates the training data received from the training apparatuses 600-2 and 600-3 as well as the training data generated by itself, and in some cases may also analyze the training data (856). The master training apparatus 600-1 transmits the aggregated/analyzed training data to the tablet 610 (858). The aggregated training data may be analyzed and/or the analyzed training data may be further analyzed at the tablet 610 (860). The aggregated training data and/or the analysis of the training data may be stored in the data storage system 614 (862).

As previously described with reference to FIG. 6 and FIG. 7, the training apparatuses 600-1, 600-2, 600-3 may also be reactive to events that occur during execution of the training drill, based on data received from other training apparatuses among the training apparatuses, for example. Communication flow of this aspect is not encompassed within FIGS. 8A and 8B, however a person skilled in the art would readily appreciate the aspects of such communication flow be based on the description provided with reference to FIGS. 6 and 7.

Figure 9:
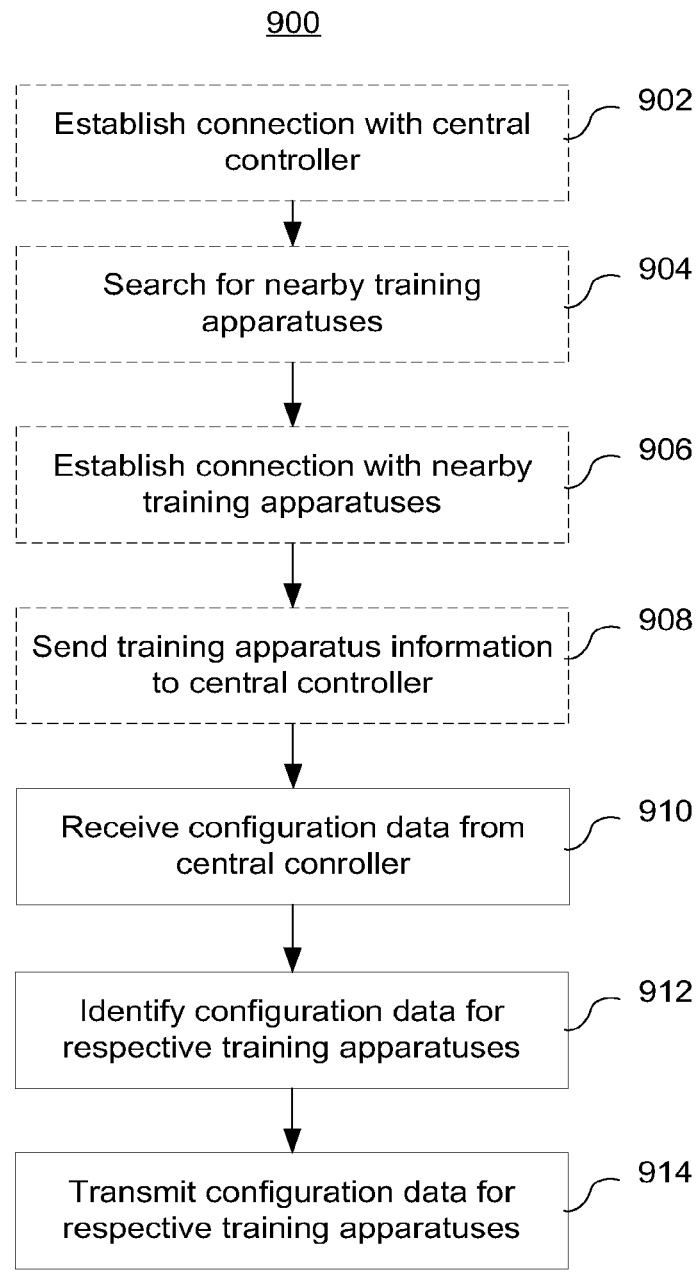
FIG. 9 shows a method for configuring a plurality of training apparatuses.

FIG. 9 shows a method 900 for configuring a plurality of training apparatuses. The method 900 may be executed by a master training apparatus among the plurality of training apparatuses. In systems where any of the plurality of training apparatuses may be used as the master training apparatus, each training apparatus may be configured to perform this method and have computer-executable instructions defining the method stored in memory as depicted in FIG. 5.

A connection is established with a central controller (902). Nearby training apparatuses are searched for (904), which may involve the master training apparatus identifying the nearby training apparatuses based on the nearby training apparatuses broadcasting a connection signal when powered on. A connection is established with the nearby training apparatuses (906), thus forming a communicatively coupled system of training apparatuses as a plurality of training apparatuses able to be configured for defining a training drill. As has been previously described, the communication network over which data is exchanged between the central controller and the master training apparatus may be the same or different than the communication network over which data is exchanged between the plurality of training apparatuses.

Information describing the plurality of training apparatuses is sent to the central controller (908). The information describing the plurality of training apparatuses may include respective training apparatus numbers to identify the available training apparatuses for configuration. The information describing the plurality of training apparatuses may further include location of the training apparatuses on the training surface.

Configuration data is received from the central controller (910). The configuration data may indicate, among other things, an instructed pass-through direction for each training apparatus to be displayed by the lighting fixture of the respective training apparatuses, an initial position and/or movement of a defense resembling member, etc. The configuration data for respective training apparatuses of the plurality of training apparatuses is determined (912). The respective configuration data for each of the training apparatuses is transmitted to the respective training apparatuses (914). Based on the respective configuration data, each training apparatus is configured for training the sports player.

Figure 10:
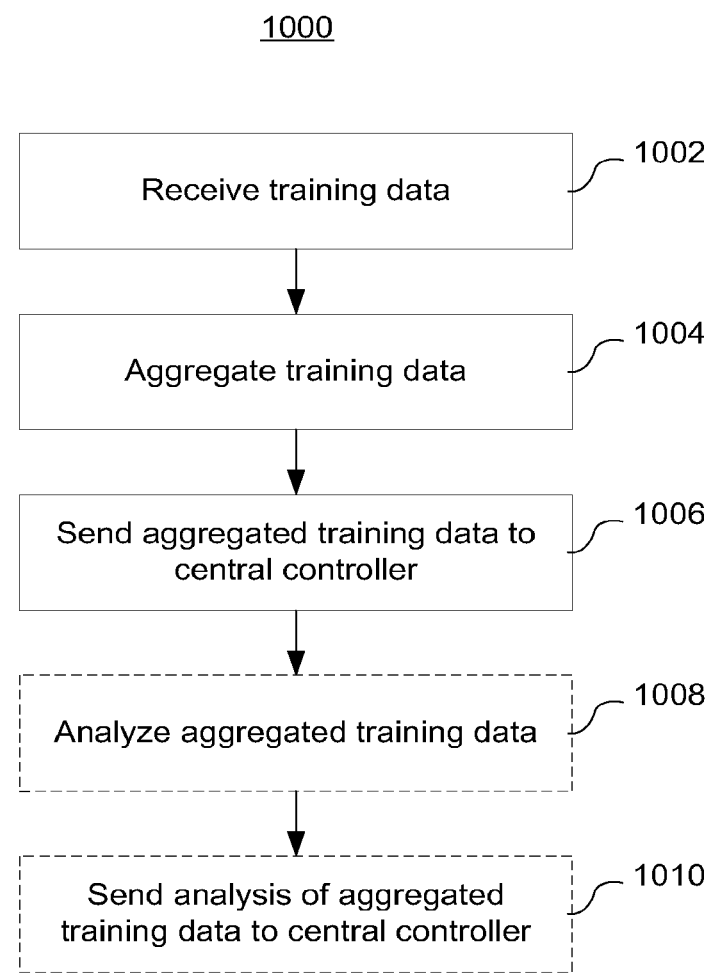
FIG. 10 shows a method for collecting data from a plurality of training apparatuses.

FIG. 10 shows a method 1000 for collecting data from a plurality of training apparatuses. The method 1000 may be executed by a master training apparatus among the plurality of training apparatuses. In systems where any of the plurality of training apparatuses may be used as the master training apparatus, each training apparatus may be configured to perform this method and have computer-executable instructions defining the method stored in memory as depicted in FIG. 5.

Training data from the plurality of training apparatuses is received (1002). The training data is aggregated (1004) and the aggregated training data is sent to a central controller (1006).

In some embodiments, the training data may be analyzed prior to sending to the central controller. The aggregated training data may be analyzed (1008), and an analysis of the aggregated training data is sent to the central controller (1010).

Particular embodiments of a training apparatus, system and methods have been described above. Although not described, the training apparatuses may be modified, for example for including a plurality of pass-under areas, possibly each with respective pass-under sensors. Further, although the indicators have been described as being provided by lights, additional, or alternative, queues may be provided to the athletes and/or coaches, for example using auditory queues from one or more speakers within the training apparatus.

It would be appreciated by one of ordinary skill in the art that the system and components shown in FIGS. 1-12 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A system for training a sports player, comprising:
a plurality of training apparatuses, each training apparatus comprising:
an obstacle member defining a pass-under area for a sport-projectile to pass through when in use, the obstacle member comprising:
a support portion for supporting the obstacle member on a training surface when in use; and
a pass-under portion supported by the support portion at a height above the training surface sufficient to allow the sport-projectile to pass between the training surface and a lower surface of the pass-under section of the obstacle member obstacle member when in use;
a lighting fixture to indicate an instructed pass-through direction of the sport-projectile through the pass-under area; and
a controller coupled with the lighting fixture and configured to:
receive, via a wireless communication interface, configuration data sent from a central controller indicating the instructed pass-through direction; and
control the lighting fixture to indicate the instructed pass-through direction,
wherein the configuration data sent from the central controller co-ordinates the instructed pass-through directions for the plurality of training apparatuses to define a training drill for the sports player.

2. The system of claim 1, wherein each training apparatus further comprises:
a first sensor configured to detect the sport-projectile passing through the pass-under area when in use,
wherein the controller is coupled to the first sensor and configured to determine a pass-through direction of the sport-projectile that passes through the pass-under area based on data received from the first sensor, and
wherein the controller is configured to send training data comprising at least one of the received first sensor data and an indication of the determined pass-through direction to the central controller.

3. The system of claim 2, wherein the controller is configured to make a determination if the determined pass-through direction of the sport-projectile that passes through the pass-under area is the same as the instructed pass-through direction, and wherein the training data further comprises the determination.

4. The system of claim 2, wherein the training data for a second training apparatus is received at a first training apparatus, and wherein the controller of the first training apparatus is configured to aggregate the training data for the second training apparatus with the training data for the first training apparatus and send the aggregated training data to the central controller.

5. The system of claim 4, wherein each training apparatus further comprises:
a clock module associated with the first sensor to associate a time with the sensor data, wherein
the training data further comprises the time associated with the sensor data,
the first training apparatus and the second training apparatus are spaced apart at a known distance, and
the central controller determines a speed of the sports player based on the time associated with the sensor data received from respective of the first training apparatus and the second training apparatus and the known distance between the first training apparatus and the second training apparatus.

6. The system of claim 5, wherein the configuration data further configures the clock module of each training apparatus to synchronize prior to beginning the drill.

7. The system of claim 2, wherein
the controller is communicatively coupled with at least one other training apparatus, and configured to transmit the determined pass-through direction to the at least one other training apparatus, and
when the controller of the at least one other training apparatus receives the determined pass-through direction the controller controls the lighting fixture to indicate a modified instructed pass-through direction based on the received determined pass-through direction.

8. The system of claim 7, wherein each training apparatus further comprises:
   a defense resembling member rotatably mounted to the obstacle member and defining a pass-between area; and
   an actuation device configured to rotate the defense resembling member in a plane parallel to the training surface when in use,
   wherein when the controller of the at least one other training apparatus receives the determined pass-through direction the controller controls the actuation device to dynamically rotate the defense resembling member based on the received determined pass-through direction.

9. The system of claim 1, wherein each training apparatus further comprises:
   a defense resembling member rotatably mounted to the obstacle member and defining a pass-between area; and
   an actuation device configured to rotate the defense resembling member in a plane parallel to the training surface when in use,
   wherein the configuration data further indicates a desired start positioning or movement of the defense resembling member, and
   wherein the controller is coupled with the actuation device and rotates the defense resembling member to the desired start positioning or in accordance with the movement.

10. The system of claim 9, further comprising:
    a second sensor configured to detect the sport-projectile passing through the pass-between area when in use,
    wherein the controller is coupled to the second sensor and configured to determine if the sport-projectile passes through the pass-between area based on data received from the second sensor, and
    wherein the controller is configured to send training data to the central controller comprising the determination of whether the sport-projectile passes through the pass-between area.

11. The system of claim 1, wherein the configuration data sent from the central controller is received at a first training apparatus among the plurality of training apparatuses, and wherein the controller of the first training apparatus is configured to send the configuration data to a second training apparatus among the plurality of training apparatuses.

12. The system of claim 1, wherein a first training apparatus among the plurality of training apparatuses communicates with the central controller via a first communication protocol, and wherein the first training apparatus communicates with a second training apparatus among the plurality of training apparatuses via a second communication protocol.

13. The system of claim 1, wherein the central controller is a portable computing device.

14. The system of claim 1, wherein the central controller is communicatively coupled with a data storage system, and wherein the central controller retrieves the configuration data from the data storage system in response to receiving a selection of the drill at the central controller.

15. A method for training a sports player, comprising:
    receiving, from a central controller, configuration data for a plurality of training apparatuses each comprising an obstacle member that defines a pass-under area for a sport-projectile to pass through and a lighting fixture to indicate an instructed pass-through direction of the sport-projectile through the pass-under area, the configuration data indicating the instructed pass-through direction for each training apparatus;
    identifying from the configuration data the instructed pass-through directions for respective training apparatuses of the plurality of training apparatuses; and
    configuring each training apparatus to indicate the respective pass-through direction by transmitting the configuration data comprising the respective pass-through direction to the respective training apparatuses.

16. The method of claim 15, wherein each training apparatus in the plurality of training apparatuses is identifiable by a number, and wherein the configuration data indicating the instructed pass-through direction for each training apparatus associates the instructed pass-through direction with respective numbers of the training apparatuses.

17. The method of claim 16, further comprising, prior to receiving the configuration data:
    establishing a connection with the central controller over a first communication network;
    searching for nearby training apparatuses;
    establishing a connection with the nearby training apparatuses over a second communication network to form a communicatively coupled system of training apparatuses as the plurality of training apparatuses; and
    sending to the central controller information describing the plurality of training apparatuses including respective training apparatus numbers to identify the available training apparatuses for configuration.

18. The method of claim 17, wherein the information describing the plurality of training apparatuses further comprises location of the training apparatuses on the training surface.

19. The method of claim 15, further comprising:
    receiving, from each training apparatus, training data for the sports player comprising data based on one or more sensors at each of the training apparatuses;
    aggregating the received training data; and
    sending the aggregated training data to the central controller.

20. The method of claim 19, further comprising:
    analyzing the aggregated training data; and
    sending an analysis of the aggregated training data to the central controller.

* * * * *